US011966769B2

(12) United States Patent
Hotinger et al.

(10) Patent No.: US 11,966,769 B2
(45) Date of Patent: Apr. 23, 2024

(54) CONTAINER INSTANTIATION WITH UNION FILE SYSTEM LAYER MOUNTS

(71) Applicant: Microsoft Technology Licensing, LLC, Redmond, WA (US)

(72) Inventors: Eric Ray Hotinger, Redmond, WA (US); Bin Du, Redmond, WA (US); Sajay Antony, Woodinville, WA (US); Steven M. Lasker, Seattle, WA (US); Siva Garudayagari, Redmond, WA (US); Dongjiang You, Redmond, WA (US); Yu Wang, Bellevue, WA (US); Samarth Shah, Bellevue, WA (US); Brian Timothy Goff, Seattle, WA (US); Shiwei Zhang, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 17/601,635

(22) PCT Filed: May 23, 2019

(86) PCT No.: PCT/CN2019/088181
§ 371 (c)(1),
(2) Date: Oct. 5, 2021

(87) PCT Pub. No.: WO2020/232713
PCT Pub. Date: Nov. 26, 2020

(65) Prior Publication Data
US 2022/0197689 A1 Jun. 23, 2022

(51) Int. Cl.
*G06F 9/455* (2018.01)
*G06F 8/61* (2018.01)

(52) U.S. Cl.
CPC ............ *G06F 9/45558* (2013.01); *G06F 8/63* (2013.01); *G06F 2009/45562* (2013.01); *G06F 2009/45579* (2013.01)

(58) Field of Classification Search
None
See application file for complete search history.

(56) References Cited

U.S. PATENT DOCUMENTS

| 8,127,284 B2 | 2/2012 | Meijer et al. | |
| 10,002,247 B2 * | 6/2018 | Suarez | G06F 21/31 |

(Continued)

FOREIGN PATENT DOCUMENTS

| CN | 106227579 A | 12/2016 |
| CN | 108369622 A | 8/2018 |

OTHER PUBLICATIONS

"International Search Report and Written Opinion Issued in PCT Application No. PCT/CN2019/088181", dated Feb. 14, 2020, 9 Pages.

(Continued)

*Primary Examiner* — Van H Nguyen
(74) *Attorney, Agent, or Firm* — Ogilvie Law Firm

(57) ABSTRACT

Computing system enhancements make container instantiation faster, reduce layer content storage demands, and make more container image formats available. A container instantiation location sends a container image pull request to a container registry, receives an image manifest, sends a layer mount request to the registry instead of a layer content download request, receives a layer mount, optionally repeats for additional layers, creates a union file system spanning the layers, and launches a container process based on the union file system without first downloading all the layer content. Inefficiencies and technical limitations of some other approaches are avoided, such as loopback mounts for snapshot expansion, creation or transmission of extra snapshots (Continued)

or extra container image clones, cluttering layer content with virtual machine settings, container system vendor lock-in, lack of container instantiation at a local system due to insufficient local storage, and lack of syscall optimization due to storage driver plugin usage.

20 Claims, 6 Drawing Sheets

(56) References Cited

U.S. PATENT DOCUMENTS

| | | | |
|---|---|---|---|
| 10,032,032 B2* | 7/2018 | Suarez | G06F 21/6218 |
| 10,235,163 B2* | 3/2019 | Carvalho | G06F 8/61 |
| 10,261,782 B2* | 4/2019 | Suarez | G06F 8/63 |
| 10,469,574 B1* | 11/2019 | Dai | H04L 67/1095 |
| 10,649,802 B2* | 5/2020 | Woods | G06F 16/14 |
| 10,656,865 B1* | 5/2020 | Janse van Rensburg | G06F 3/061 |
| 10,922,096 B2* | 2/2021 | Shrivastava | G06F 9/4843 |
| 11,029,869 B1* | 6/2021 | Patlasov | G06F 9/45558 |
| 2017/0371693 A1 | 12/2017 | Corrie et al. | |
| 2018/0095973 A1 | 4/2018 | Huang et al. | |
| 2018/0137174 A1 | 5/2018 | Cahana et al. | |
| 2019/0147047 A1 | 5/2019 | Chen | |

OTHER PUBLICATIONS

T. Harter, et al., "Slacker: Fast Distribution with Lazy Docker Containers", retrieved from <<https://pdfs.semanticscholar.org/5947/10511ce2177ff7dbbc62fa75dbf14fc7ca26.pdf>>, Feb. 22, 2016, 16 pages.

"aufs", retrieved from <<https://en.wikipedia.org/wiki/Aufs>>, Dec. 24, 2018, 3 pages.

"Union mount", retrieved from <<https://en.wikipedia.org/wiki/Union_mount>>, Feb. 7, 2019, 3 pages.

"OverlayFS", retrieved from <<https://en.wikipedia.org/wiki/OverlayFS>>, Feb. 25, 2019, 2 pages.

"Live CD", retrieved from <<https://en.wikipedia.org/wiki/Live_CD>>, Mar. 14, 2019, 8 pages.

"OS-level virtualization", retrieved from <<https://en.wikipedia.org/wiki/OS-level_virtualization>>, Apr. 9, 2019, 4 pages.

"Open Container Initiative", retrieved from <<https://en.wikipedia.org/wiki/Open_Container_Initiative>>, Feb. 14, 2019, 1 page.

"ext4", retrieved from <<https://en.wikipedia.org/wiki/Ext4>>, Mar. 7, 2019, 9 pages.

"Server Message Block", retrieved from <<https://en.wikipedia.org/wiki/Server_Message_Block>>, Apr. 15, 2019, 6 pages.

"Filesystem in Userspace", retrieved from <<https://en.wikipedia.org/wiki/Filesystem_in_Userspace>>, Apr. 14, 2019, 4 pages.

"Loop device", retrieved from <<https://en.wikipedia.org/wiki/Loop_device>>, Sep. 19, 2018, 4 pages.

"Docker (software)", retrieved from <<https://en.wikipedia.org/wiki/Docker_(software)>>, Apr. 1, 2019, 8 pages.

Emin Gün Sirer, et al., "A Practical Approach for Improving Startup Latency in Java Applications", retrieved from <<http://www.cs.cornell.edu/people/egs/papers/kimera-wcsss99.pdf>>, Feb. 26, 1999, 9 pages.

"ksync", retrieved from <<https://vapor-ware.github.io/ksync/>>, no later than Apr. 17, 2019, 9 pages.

Avi Kivity, et al., "OSv—Optimizing the Operating System for Virtual Machines", retrieved from <<https://www.usenix.brg/system/files/conference/atc14/atc14-paper-kivity.pdf>>, Jun. 19, 2014, 13 pages.

Theo Chamley, "7 Google best practices for building containers", retrieved from <<https://cloud.google.com/blog/products/containers-kubernetes/7-best-practices-for-building-containers>>, Jul. 10, 2018, 5 pages.

Chen-Nien Mao, et al., "Minimizing Latency of Real-Time Container Cloud for Software Radio Access Networks", retrieved from <<https://ieeexplore.ieee.org/abstract/document/7396222>>, Nov. 30, 2015, 2 pages.

Chenyu Mao, et al., "Minimizing Latency of Real-Time Container Cloud for Software Radio Access Networks", retrieved from <<https://www.semanticscholar.org/paper/Minimizing-Latency-of-Real-Time-Container-Cloud-for-Mao-Huang/7fe7f9d5d2171138aa3d2ff15aaead71706eb24e>>, 2015, 7 pages.

"Lazy Loading", retrieved from <<https://webpack.js.org/guides/lazy-loading/>>, no later than Apr. 17, 2019, 4 pages.

Bob Reselman, "Logging for Unikernels", retrieved from <<https://dzone.com/articles/logging-for-unikernels>>, Mar. 11, 2016, 9 pages.

Jessica Greben, "Digging into Docker layers", retrieved from <<https://jessicagreben.medium.com/digging-into-docker-layers-c22f948ed612>>, Nov. 12, 2016, 6 pages.

"Container services", retrieved from <<https://www.microsoft.com/en-us/cloud-platform/containers>>, no later than Jan. 19, 2019, 11 pages.

Jon Beck, "Introducing the new Dv3 and Ev3 VM sizes", retrieved from <<https://azure.microsoft.com/en-us/blog/introducing-the-new-dv3-and-ev3-vm-sizes/>>, Jul. 13, 2017, 7 pages.

Alan R. Earls, "container image", retrieved from <<https://searchitoperations.techtarget.com/definition/container-image>>, no later than Apr. 20, 2019, 6 pages.

"Kubernetes", retrieved from <<https://en.wikipedia.org/wiki/Kubernetes>>, Apr. 8, 2019, 6 pages.

"Open Container Initiative", retrieved from <<https://github.com/opencontainers/image-spec/blob/main/spec.md>>, no later than Apr. 20, 2019, 3 pages.

"Virtual machine", retrieved from <<https://en.wikipedia.org/wiki/Virtual_machine>>, May 2, 2019, 8 pages.

"Virtualization", retrieved from <<https://en.wikipedia.org/wiki/Virtualization>>, May 2, 2019, 5 pages.

"Extended European Search Report Issued in Application No. 19929320.0", dated Dec. 19, 2022, 15 Pages.

Nathan, et al., "CoMICon: A Co-Operative Management System for Docker Container Images", In Proceedings of International Conference on Cloud Engineering, Apr. 4, 2017, pp. 116-126.

\* cited by examiner

CONTAINER INSTANTIATION WITH UNION FILE SYSTEM LAYER MOUNTS

BACKGROUND

In the context of computing technologies, "virtualization" may be used to create a version of a thing which has greater generality or greater flexibility than an original version of that thing. For example, computer hardware platforms, digital storage devices, and computer network resources each have non-virtual versions that are tied to specific physical hardware items, and virtual versions that are implemented with software that can execute on a variety of different kinds of physical hardware. Virtualizations may have greater generality (e.g., the ability to run on different hardware) and greater flexibility (e.g., the relative ease of making function changes) than their non-virtualized counterparts because a greater amount of the virtualization's functionality is implemented as software.

Virtualization may be performed on a wide variety of physical items, and may be performed at various levels. In the content of cloud computing, for example, virtualization assists in providing functionality at different levels above underlying hardware. These levels include "infrastructure as a service" (IaaS), "platform as a service" (PaaS), and "software as a service" (SaaS). At a finer granularity, cloud computing is often performed using "virtual machines" which are virtualizations of a physical computer system; the virtual machines run on a hypervisor, which is a virtualization of underlying computing, storage, and networking hardware.

SUMMARY

Some embodiments use or perform operations that instantiate a container at an instantiation location in a cloud or other computing system. From a perspective at the instantiation location, these operations may include: sending a container image pull request to a container registry, with the pull request identifying a container image; receiving an image manifest which lists a plurality of layers that collectively constitute the container image, with each layer having a respective layer identification and a respective layer content; sending a layer mount request to the container registry, with the layer mount request identifying a layer of the container image; receiving a layer mount which provides access to a registry-resident form of the content of the layer identified in the layer mount request without also providing access to all content of all of the layers that collectively constitute the container image; creating a union file system which spans the layers that collectively constitute the container image and is based on at least one received layer mount; and launching a container process at the instantiation location based on the union file system. These operations avoid transmitting at least a portion of the layer content of the identified layer from the container registry through a network to the instantiation location prior to launching the container process.

From a perspective at the container registry, the operations performed to support instantiation of the container at the instantiation location may include: the container registry receiving a container image pull request, the pull request identifying a container image; the container registry sending an image manifest which lists a plurality of layers that collectively constitute the container image, each layer having a respective layer identification and a respective layer content; the container registry receiving a layer mount request, the layer mount request identifying a layer of the container image; and the container registry sending a layer mount which provides access to a registry-resident form of the content of the layer identified in the layer mount request without also providing access to all content of all of the layers that collectively constitute the container image. The container registry avoids sending at least a portion of the layer content of the identified layer prior to the container process launch at the instantiation location.

Some embodiments of teachings presented herein include or communicate with container instantiation functionality that includes digital hardware configured to perform certain operations. The configured hardware includes a memory and a processor, both located at an instantiation location such as a particular virtual machine or server. The operations may include (a) sending a container image pull request to a container registry, the pull request identifying a container image, (b) receiving an image manifest which lists a plurality of layers that collectively constitute the container image, each layer having a respective layer identification and a respective layer content, (c) sending a layer mount request to the container registry, the layer mount request identifying a layer of the container image, (d) receiving a layer mount which provides access to a registry-resident form of the content of the layer identified in the layer mount request without also providing access to all content of all of the layers that collectively constitute the container image, (e) creating a union file system which spans the layers that collectively constitute the container image, and (f) launching a container process at the instantiation location based on the union file system, without first obtaining at the instantiation location all content of all of the layers that collectively constitute the container image. The memory is configured by at least the image manifest and the union file system; the processor is configured by instructions that perform the operations.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
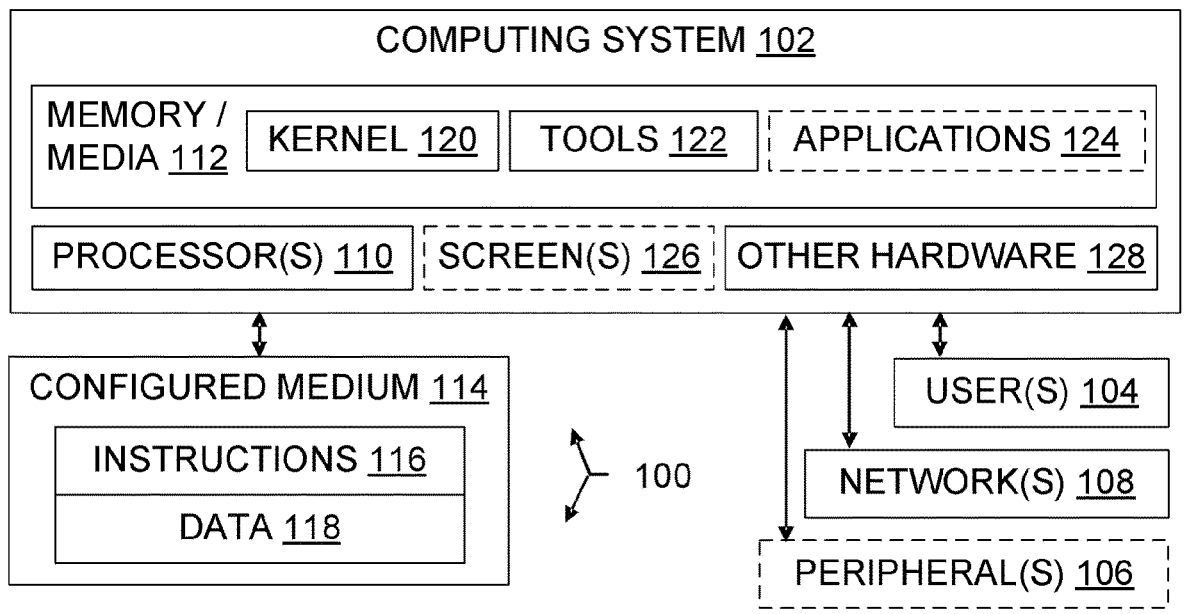
FIG. 1 is a block diagram illustrating computer systems generally and also illustrating configured storage media generally.

Many innovations expand beyond their origins, but understanding an innovation's origins can help one more fully appreciate the innovation. In the present case, some teachings described herein were motivated by technical challenges of reducing the startup time for cold-start containers, namely, containers which have not been cached locally. Other technical challenges addressed by the innovations taught here will also be apparent to one of skill from the discussion provided below.

Containers are virtualizations. In that regard, they resemble virtual machines. But a virtual machine virtualizes computer hardware, so each virtual machine typically has its own copy of an operating system, whereas a container system virtualizes an operating system. Different containers can provide respective user address spaces with respective visibilities into an underlying shared operating system. Thus, multiple workloads in the form of containers can run on a single operating system instance. A computer program running on an operating system on a computer without container virtualization has access (at least by default) to most if not all of the computational resources of that computer, such as connected devices, files and directories, network shares, and processors. However, programs running inside a container can only see the container's contents and the devices that have been assigned to the container.

A container may be referred to by other names, depending on the context, such as "OS-level virtualization instance", "zone", "virtual private server", "partition", "virtual environment", "virtual kernel", or "jail". One of skill will acknowledge, however, that some of these names also have other meanings which do not necessarily involve containers, e.g., "partition" may refer to a disk partition, and "zone" may refer to a data center availability zone.

Containers have layers, which have respective content. A container runs as a container process. Thus, "container" as used herein may refer to the process that accesses the layers, the layers that constitute the container, the content of the layers, metadata such as a list of the layers, or a combination thereof. The intended meaning will be clear to one of skill, through the presence of qualifying terminology such as "container process", or through context. Any remaining ambiguity should be resolved in the way that gives the description or claim involved its broadest valid and operational meaning.

A container's execution lifecycle in some systems may include pulling (i.e., downloading) content from a remote repository, unpackaging the content, creating a union file system on top of the content, and lastly creating a process based off the newly defined file system. Unpackaging content may include extracting selected content from surrounding data, e.g., copying content for a layer L out of a larger image file that includes content not only of layer L but also content of other layers. Unpackaging content may also include unpacking, which is used herein as a synonym for "decompressing". Unpackaging content may also include decrypting content. In some systems, the majority of time spent after a container instantiation is requested and before the execution of the container's process begins is spent during the pulling and unpacking of content.

Some embodiments of teachings provided herein permit fast instantiation of containers using hybrid file systems. A container is "instantiated" when its container process is launched and has access (directly or via layer mount) to the content of all of the layers that belong to the container. As used herein, a "fast" instantiation of a container as a container process is an instantiation sequence that (a) uses one or more layer mounts before the container process is launched in order to give the container process access to layer content, and (b) takes less than one-tenth of the time that would be (or actually was) used by an alternate instantiation sequence which downloads (and may also unpack) layer content before the container process launch, instead of using one or more layer mounts. Fast container instantiations use layer mounts as taught herein, instead of downloading and (when needed) unpacking layer content before the container process is launched. Some embodiments vastly reduce or eliminate the pulling and unpacking of content, thus allowing them to achieve near-instant container instantiation.

Some embodiments described herein may be viewed by some people in a broader context. For instance, concepts such as content, downloading, identification, launching, lists, and computational processes generally, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as the slow instantiation of containers and the downloading of duplicate or unnecessary layer content. Other configured storage media, systems, and processes involving content, downloading, identification, launching, lists, or computational processes generally are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular file systems, software development environments, programming languages, container format examples, development tools, identifiers, files, data structures, notations, control flows, pseudocode, security mechanisms, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as instantiating containers and measuring container instantiation performance, which are activities deeply rooted in computing technology. Some of the technical mechanisms discussed include, e.g., layer mounts, union file systems, changesets, manifests, caches, repositories, and registries. Some of the technical effects discussed include, e.g., faster container instantiations, avoidance of image cloning, avoidance of virtual machine settings in layer content, sharing of layers between containers, instantiation of a container despite a lack of local storage sufficient to hold all of the container's layer content, and access to layer content without requiring use of snapshots. Thus, purely mental processes are excluded. Some embodiments improve the functioning of computing systems by making containers more rapidly available in practice, by reducing layer content storage demands, or by broadening the range of container image formats available for use without incurring a performance hit. Other advantages based on the technical characteristics of the teachings will also be apparent to one of skill from the description provided.

Note Regarding Hyperlinks

This disclosure may contain various URIs, hyperlinks, IP addresses, and/or other items which might be considered browser-executable codes. These items are included in the disclosure merely as a courtesy, rather than being included to reference the contents of the web sites or files that they identify as necessary support for the description of embodiments. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IDE: integrated development environment, sometimes also called an "interactive development environment"
IoT: internet of things
IP: internet protocol
LAN: local area network
OS: operating system
PaaS or PAAS: platform-as-a-service
RAM: random access memory
ROM: read only memory
SSD: solid state drive
UEFI: Unified Extensible Firmware Interface
URI: uniform resource identifier
URL: uniform resource locator
VM: virtual machine
VHD: virtual hard disk
VHDX: virtual hard disk extended
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

In the context of container instantiation, "local" herein means local to an instantiation location 204. The instantiation location 204 is not necessarily also local to a developer 104 who requested the instantiation or whose actions led to the instantiation, and is also not necessarily local to an integrated development environment or virtual machine or other tool 122 which manages instantiated containers.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as sending or receiving an image pull request or a manifest or a layer mount request or a layer mount, creating a union file system, launching a container process, and many other operations discussed, are understood herein as inherently digital. A human mind cannot interface directly with a CPU or other processor, or with RAM or other digital storage, to read and write the necessary data to perform the container instantiation steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, ascertaining, basing, caching, cloning, configuring, constituting, creating, expanding, identifying, launching, listing, locating, measuring, mounting, omitting, packing, providing, receiving, retrieving, sending, sharing, spanning, storing, transmitting (sending or receiving or both), unifying, unmounting, unpacking, using (and accesses, accessed, ascertains, ascertained, etc., and avoiding any of the steps) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the *In re Nuijten* case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, debuggers, profilers, compilers, interpreters, software development tools and tool suites, hardware development tools and tool suites, diagnostics
124 applications, e.g., word processors, web browsers, spreadsheets, games, email tools
126 display screens, also referred to as "displays"
128 computing hardware not otherwise associated with a reference number 106, 108, 110, 112, 114
202 instantiation environment
204 instantiation location, e.g., a particular virtual machine, server, network node, URI or URL, or cluster, or hardware box, or virtual location
206 registry, namely, a list or other data structure which identifies computational resources stored in one or more repositories, and the locations of those resources; "registry" also refers to the server or other computing system which contains the list of computational resources
208 registry environment; includes a registry and all repositories which store computational resources identified in the registry
210 container, e.g., a computing construct which provides user space virtualization and does not itself include an operating system
212 container image; also refers to file(s) holding the container image
214 container layer; also refers to file(s) holding the container layer
216 digital or other electronic communication for instantiating a container
302 cloud; may also be referred to as "cloud computing environment"
304 virtual machine, e.g., a computing construct which provides hardware virtualization and includes an operating system
306 production environment
402 container process
404 union file system
406 content of container layer
408 container image manifest
410 layer mount, that is, a URI or other data which identifies the location of layer content and can be used at a mount point to provide a container process with access to the layer content
412 changeset, e.g., a set of instructions to make additions, deletions, or other modifications to a file system of a container layer
414 file system of a container layer
416 container image configuration, e.g., an ordered group of root file system changes and corresponding execution parameters for use in a container runtime
418 metadata store
502 request to pull a copy of a container image from a registry or repository to another location
504 request for a layer mount 410
506 an identification of a layer; also referred to as "layer identifier"; may be, e.g., a hash of the layer's content; also refers to the act of identifying a layer
600 relationship which maps one or more layer mounts to one or more static layers
602 one-to-one, a.k.a. 1-to-1 or 1:1, meaning one layer mount corresponds to one static layer, and in particular, one layer mount corresponds to the content of one and only one static layer
604 one-to-many, a.k.a. 1-to-many or 1:N, meaning one layer mount corresponds to multiple static layers, and in particular, one layer mount corresponds to the content of more than one static layer but not to all of the static layers of a particular container of interest
700 data flow diagram illustrating container instantiation with content download before container process launch, and no use of layer mounts
702 a download of a container image or a container layer; also refers to act of downloading; one of skill will acknowledge that unpacking often follows downloading
704 container image cache
706 container image identifier; also refers to act of identifying an image
708 container image repository
710 container image repository identifier
712 container image tag, e.g., version indicator or other metadata
714 size of container image, e.g., in gigabytes or other storage units
716 container layer cache
718 send a container image pull request 502; unless otherwise stated, all send and receive actions are assumed to include transmission of digital communication over a computer network
720 receive a container image manifest 408
722 send a request fora delta layer, e.g., a layer within a surrounding container image also storing other layers 724 a delta layer; may have the same content as a layer 214 generally
726 receive a layer URL
728 layer URL
730 request for content of a layer which is stored at the URL in the request
732 compressed version of layer content 406
800 data flow diagram illustrating container instantiation with content download after container process launch, and use of layer mount
802 request a layer mount 410; also refers to the act of sending a layer mount request 504
804 receive a layer mount 410
806 expanded (i.e., never compressed or else now uncompressed, never packed or else previously packed and now unpacked) layers 214; used interchangeably with "unpacked" in the context of caching
900 flowchart; 900 also refers to container instantiation methods illustrated by or consistent with the FIG. 9 flowchart
902 list the layers which constitute a container image, e.g., identify the layers in a manifest or other data structure
904 constitute a container image, that is, collectively define at least the static (pre-runtime) layer content of a container image
906 access to content of a layer, e.g., a mechanism which provides access; also refers to the act of accessing the layer content by reading or writing or both
908 create a union file system
910 span layers, e.g., provide access to content of layers through a single unified file system
912 be based upon, e.g., be derived from or rely upon
914 transmit, i.e., send or receive by digital or other electronic functionality; like other acts discussed herein, may be preceded by "avoid" to indicate that the act is avoided or prevented, which avoidance is itself an act
916 launch a container process
918 have a location, be located at a particular place (physical or virtual)
920 instantiate a container
1000 flowchart; 1000 also refers to container instantiation methods illustrated by or consistent with the FIG. 10 flowchart (which incorporates the steps of FIG. 9)
1002 measure elapsed time
1004 elapsed time; may be expressed in processor cycles, milliseconds, or another unit
1006 provide a performance gain
1008 performance gain, e.g., faster accomplishment of defined task, lower use of memory or network bandwidth or another computational resource, or improved security (data confidentiality, data integrity, or data availability)
1010 receive a container image pull request
1012 send a container manifest
1014 receive a layer mount request
1016 send a layer mount
1018 send layer content
1020 compress (i.e., pack) layer content
1022 decompress (i.e., unpack) layer content
1024 store data in a cache
1026 retrieve data from a cache
1028 share layer content among multiple containers
1030 use a loopback mount; when preceded by "avoid" refers to avoiding use of a loopback mount
1031 loopback mount
1032 clone a container image; when preceded by "avoid" refers to avoiding cloning a container image
1034 use or store virtual machine settings in a container layer; when preceded by "avoid" refers to avoiding using or storing virtual machine settings in a container layer
1036 virtual machine settings
1038 store layer content in a file
1040 file
1042 access (read or write) layer content
1044 container image snapshot
1046 ascertain that a copy of layer content is stored locally
1048 local storage, e.g., disk, RAM cache, or high speed network attached storage
1050 omit a layer L from a mount request, that is, do not request a layer mount for that layer L
1052 use a storage driver plugin; when preceded by "avoid" refers to avoiding use of a storage driver plugin
1054 storage driver plugin
1056 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122 which is itself a computing technology development tool that provides a developer with a set of coordinated computing technology development tools 122 such as compilers, interpreters, decompilers, assemblers, disassemblers, source code editors, profilers, debuggers, simulators, fuzzers, registry and repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 8, some embodiments use or provide a functionality-enhanced system 400. The functionality enhancement promotes container instantiation efficiencies by providing technical mechanisms which can (a) instantiate containers at an instantiation location that is remote from a container registry without first downloading all layer content to the instantiation location, (b) avoid downloading content of layers that do not belong to a particular container, not only before instantiation but even after the container process is launched, and (c) avoid various technical limitations and requirements of prior approaches, involving items or situations such as loopback mounts, snapshots, container image clones, virtual machine settings, container system vendor lock-in, insufficient local storage, and storage driver plugins. Some of these technical mechanisms include layer mounts, just-in-time downloading of layer content, storage of layer content in per-layer files rather than per-image files, and data structure format compliance with an industry specification known as the Open Container Initiative (OCI) (see, e.g., opencontainers dot org). The teachings presented herein can be selectively applied, and mixed in various ways. Not every embodiment provides the same set or extent of container instantiation efficiencies, and other efficiencies and advantages that are not listed in this paragraph may also be provided by some embodiments. Also, not every embodiment provides or uses the same set of technical mechanisms in the same way, and other technical mechanisms that are not listed in this paragraph may also be used in some embodiments.

Figure 2:
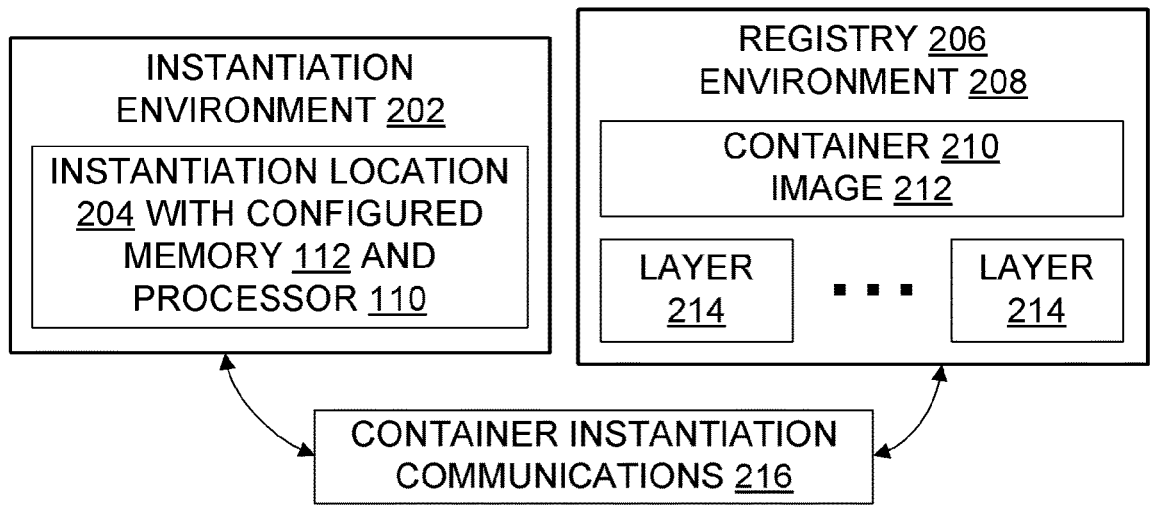
FIG. 2 is a block diagram illustrating a container instantiation computing environment and a container registry computing environment.

FIG. 2 illustrates a container instantiation computing environment 100, 202 and a container registry computing environment 100, 208. Although shown with separate boxes for clarity of illustration, in a given implementation the environments 202 and 208 may overlap, or one may contain the other.

The illustrated instantiation environment 202 includes an instantiation location 204 where one or more containers 210 will be instantiated 920. The instantiation location 204 has special-purpose instantiation technology, which may include special-purpose hardware 128 or may include general-purpose hardware 110, 112 that is configured with data 118 and instructions 116 to perform container instantiation operations as taught herein.

The illustrated registry environment 208 includes a container registry 206, and thus implicitly includes repositories 708 that are referenced by the registry 206. The repositories 708 store container images 212. Each image includes layers 214. In general, the layers 214 stored in the registry environment 208 are static, and a dynamic (writable) layer 214 is added to the static layers 214 at the instantiation location 204 when instantiating the container. The instantiation environment 202 and the registry environment 208 communicate by way of container instantiation communications 216.

Figure 3:
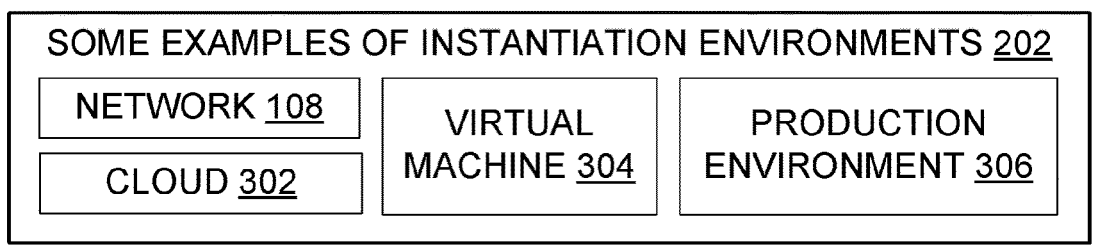
FIG. 3 is a block diagram illustrating some examples of container instantiation environments.

FIG. 3 shows some examples of container instantiation environments 202. Examples shown include a network 108, a cloud 302, a virtual machine 304, and a production environment 306. However, one of skill will recognize that a container 210 may also run in other environments, and that some of these environments may overlap, e.g., a virtual machine 304 may reside in a cloud 302.

Figure 4:
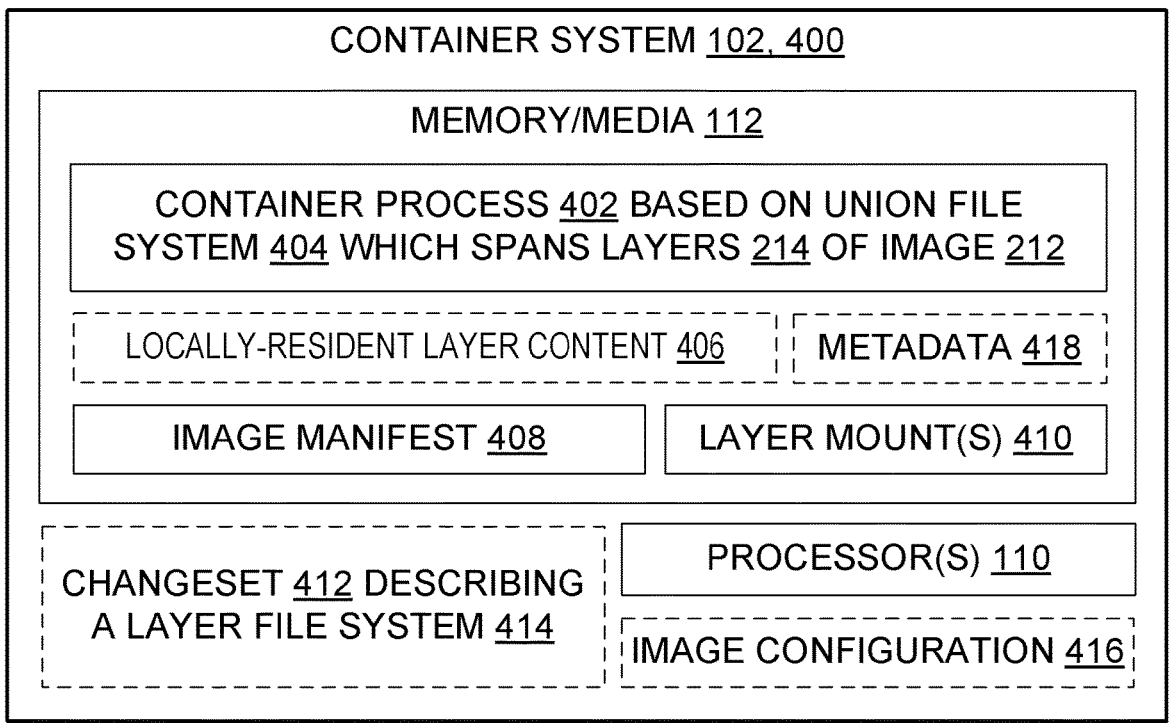
FIG. 4 is a block diagram illustrating aspects of a system which is configured for fast container instantiation using a union file system and container layer mount functionality.

FIG. 4 illustrates a system 102, 400 which is configured for fast container instantiation; instantiation includes the launch of a configured container process 402. The system 400 includes a union file system 404 which spans the layers 214 of an image 212 of the instantiated container 210. The layers 214 are identified in an image manifest 408. Content 406 of at least one layer 214 is accessible through a layer mount 410; other layer content 406 may be stored locally at the instantiation location 204. In conformance with OCI or in other contexts, a container may also include a changeset 412 which describes a layer 214 file system, an image configuration 416, or both.

Figure 5:
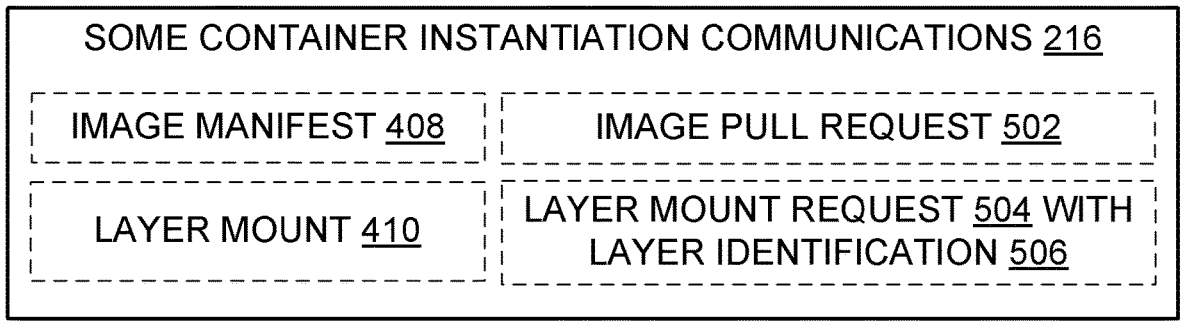
FIG. 5 is a block diagram illustrating some container instantiation communications.

FIG. 5 illustrates some container instantiation communications 216. Examples shown include an image manifest 408, a layer mount 410, a container image pull request 502, and a layer mount request 504. Some other instantiation communications 216, 406, 410, 702, 718, 720, 722, 724, 726, 728, 730, 802, 804 are shown in FIGS. 7 and 8.

Figure 6:
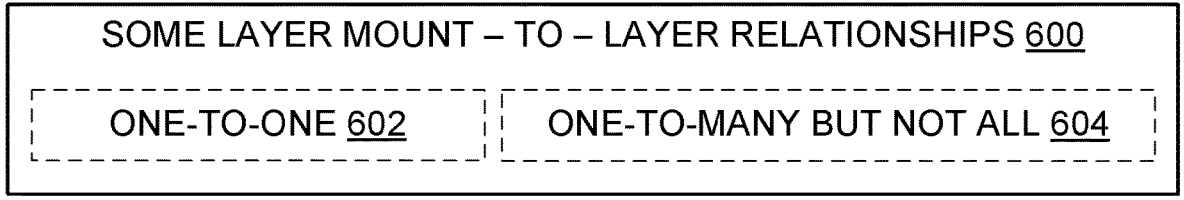
FIG. 6 is a block diagram illustrating some relationships that may be implemented between a layer mount and one or more static layers of a container.

FIG. 6 illustrates some relationships 600 between a layer mount 410 and one or more static container layers 214. Examples shown include a one-to-one relationship 602 (one layer mount to one static layer) and a one-to-many but not all relationship 604 (one layer mount to multiple static layers but not all static layers of the container). Some traditional approaches put all static layers 214 of a container into a single image file 1040, in a one-to-all relationship that is not shown in FIG. 6.

Figure 7:
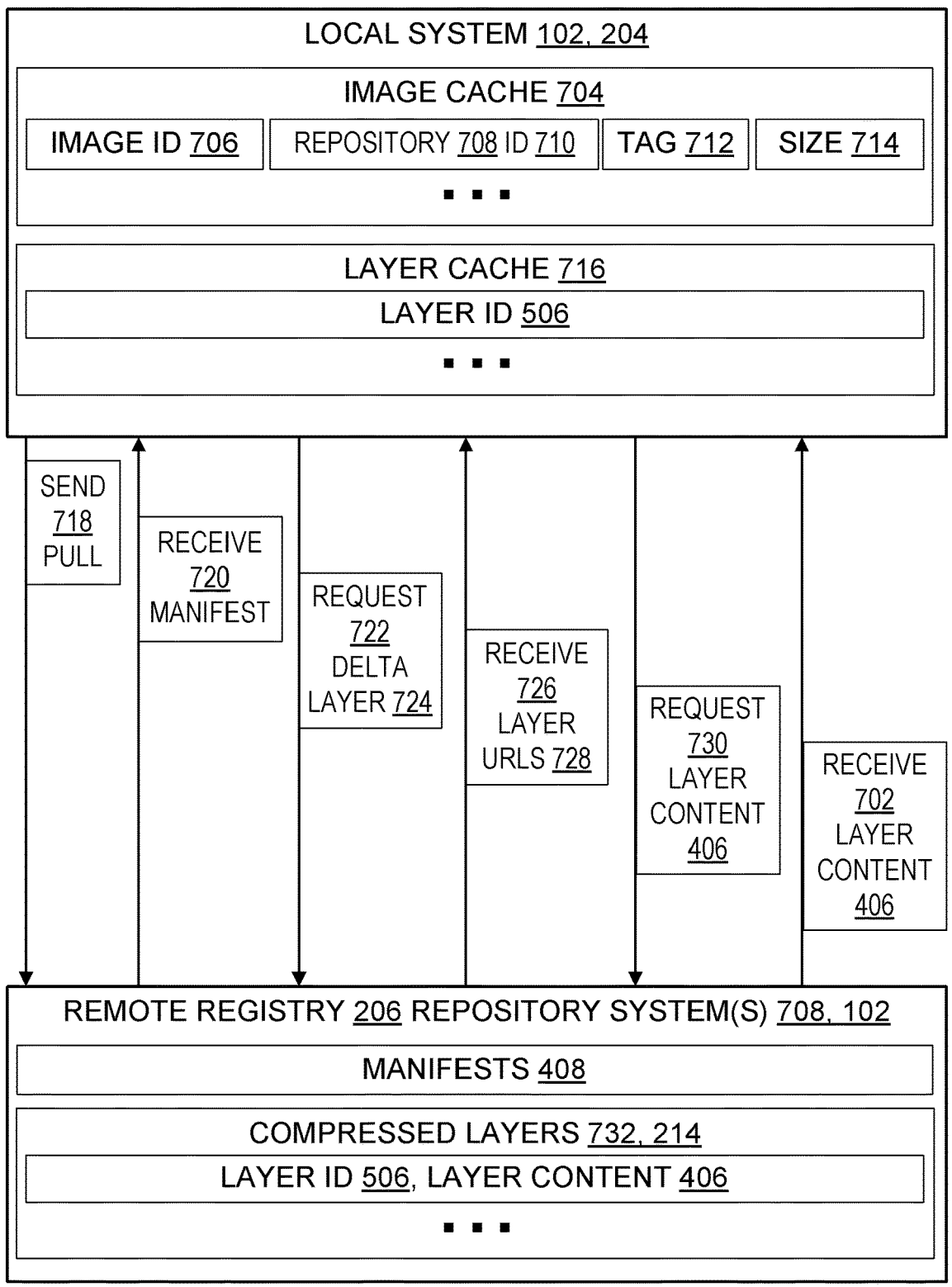
FIG. 7 is a data flow diagram illustrating a container instantiation approach in which all content of a layer is downloaded without use of a layer mount.
Figure 8:
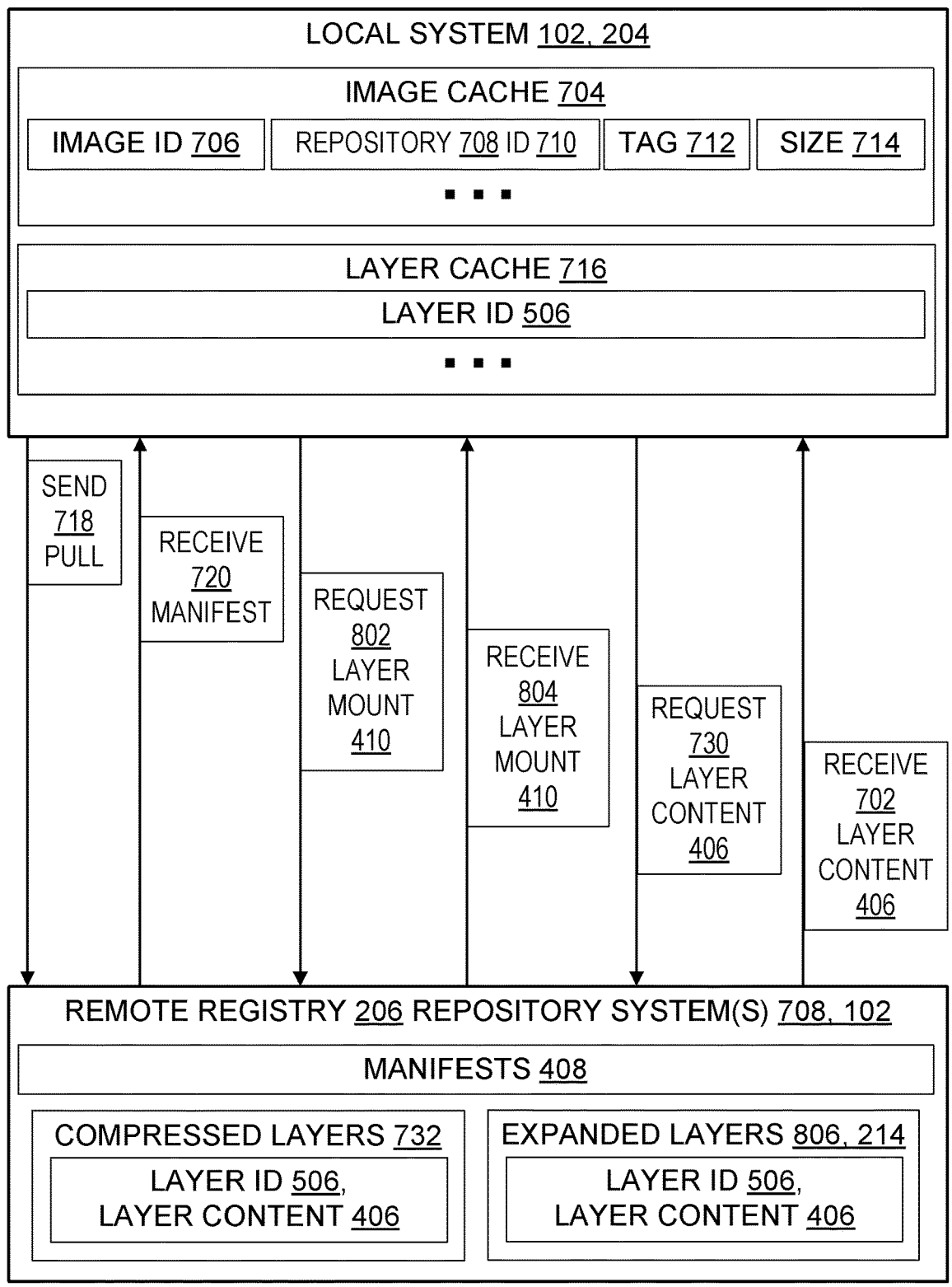
FIG. 8 is a data flow diagram illustrating a container instantiation approach in which most or all of the content of a layer is downloaded only after a container which includes the layer has been launched.

FIG. 7 illustrates a container instantiation approach in which all content 406 of a layer 214 is downloaded 702 without use of a layer mount 410. In some situations using the illustrated approach, container instantiation may occur only after all static layers are downloaded, but in other situations less than all of the static layers are downloaded before instantiation and at least one layer mount 410 is used instead of a pre-instantiation download. Thus, although FIG. 7 is consistent with some strictly traditional approaches to container instantiation, FIG. 7 is also consistent with some aspects of some non-traditional innovative approaches to container instantiation and it would be misleading to suggest otherwise.

In the approaches and architectures shown in FIG. 7, a local system 102, which serves as an instantiation location 204, has an image cache 704 and a layer cache 716. In alternate embodiments, one or both of these caches is not present at the local system.

The illustrated image cache 704 includes zero or more image entries, with one image entry shown for illustration in FIG. 7. The image cache entry shown includes an image ID 706, a repository ID 710, a tag field 712 for metadata such as version number, author, permissions, revision history, developer comments, and the like, and a size field 714. In alternate embodiments, one or more of these entry fields is not present, and additional fields may also be present in an image cache entry.

The illustrated layer cache 704 includes zero or more layer entries, with one layer entry shown for illustration in FIG. 7. The layer cache entry shown includes a layer ID 506. In alternate embodiments, additional fields may also be present in a layer cache entry, and locally resident layer content 406 may be present in the cache.

FIG. 7 also shows a registry 206 with one or more member repositories 708. For convenience, one may refer to an item as stored at the registry when an implementation actually stores the item at a repository after locating the item through data stored at the registry. In this sense, the registry shown holds compressed container layers 732, 214. The registry also holds container manifests 408; these will often be stored local to the registry itself rather than being stored in a repository.

FIG. 7 also illustrates data movement, in the form of container instantiation communications 216, from the perspective of the local system 102, 204. Thus, FIG. 7 explicitly shows sending 718 a container image pull request 502 and implicitly shows receiving 1010 the pull request, implicitly shows sending 1012 a container image manifest 408 and explicitly shows receiving 720 the manifest, explicitly shows sending 722 a container delta layer 724 request and implicitly shows receiving the delta layer request, implicitly shows sending a layer URL 728 and explicitly shows receiving 726 the delta layer URL, explicitly shows sending 730 a request for layer content 406 and implicitly shows receiving the layer content request, and implicitly shows sending the layer content 406 and explicitly shows receiving 702 the layer content 406. One of skill understands that when the perspective is changed between the local system 102, 204 and the registry 206, sending and receiving are swapped. That is, a communication 216 that is a send operation from the local system perspective is a receive operation from the registry perspective, and vice versa.

FIG. 8 illustrates a container instantiation approach in which most or all of the content of a layer 214 is downloaded 702 only after a container which includes the layer has been launched. In addition to some of the items and operations discussed above in connection with FIG. 7, FIG. 8 shows expanded (not compressed) layer content 406, referred to for convenience as expanded layers 806. FIG. 8 also shows explicitly sending 802 a layer mount request 504 and implicitly shows receiving 1014 that request, and implicitly shows sending 1016 a layer mount 410 and shows explicitly receiving 804 the layer mount.

Some embodiments use or provide a container instantiation system 400, 102 which includes a memory 112 and a processor 110 in operable communication with the memory at an instantiation location 204. The processor is configured to perform steps which include (a) sending 718 a container image pull request 502 to a container registry 206, the pull request identifying 706 a container image 212, (b) receiving 720 an image manifest 408 which lists 902 a plurality of layers 214 that collectively constitute 904 the container image, each layer having a respective layer identification 506 and a respective layer content 406, (c) sending 802 a layer mount request 504 to the container registry, the layer mount request identifying 506 a layer of the container image, (d) receiving 804 a layer mount 410 which provides access 906 to a registry-resident form of the content of the layer identified in the layer mount request without also providing access to all content of all of the layers that collectively constitute the container image, (e) creating 908 a union file system 404 which spans 910 the layers that collectively constitute the container image, and (f) launching 916 a container process 402 at the instantiation location based on 912 the union file system, without first obtaining 914 at the instantiation location all content of all of the layers that collectively constitute the container image. In some embodiments, the memory 112 includes (e.g., contains, is configured by) at least the image manifest 408 and the union file system 404. One of skill will recognize that a union file system implements a union mount for other file systems, and can be implemented using software such as unionfs software, aufs software, overlayfs software or other software providing union mount functionality.

In these embodiments, one of skill will acknowledge that the layer mount is not a snapshot ID because the layer mount provides access to a registry-resident form of the content of the layer identified in the layer mount request without also providing access to all content of all of the static layers that collectively constitute the container image. A snapshot ID provides access to all content of all of the container's static layers.

One of skill will also understand that the container process 402 is launched without first downloading and extracting all of the static layers 214, because the container process is launched "without first obtaining at the instantiation location all content of all of the layers that collectively constitute the container image".

Some embodiments support flattening specific layers dynamically, but still allow a 1:1 relationship 602. In some embodiments, multiple layer mounts 410 are received at the instantiation location 204, and each said received layer mount corresponds in a one-to-one manner 602 to one static layer 214 of the container image 212. In some embodiments, a received layer mount 410 corresponds in a one-to-many manner 604 to multiple static layers of the container image, but the received layer mount does not correspond to all of the static layers that collectively constitute 904 the stored container image.

Some embodiments support hybrid file system overlays. In some, the launched union file system 404 includes a layer mount 410 denoted here as local-mount which provides access to an unpacked locally-resident layer content 406 that resides in a local storage device 106, 112 which is local to the instantiation location 204, and the launched union file system 404 also includes a layer mount 410 denoted here as registry-mount which provides access 906 to an unpacked registry-resident layer content 806 that resides in a registry storage device 112 which is not local to the instantiation location, but may instead be local to a registry server or a repository server, for example.

In some embodiments, a local system can launch 916 a container 210 whose image 212 is too big to store locally. Assume an amount of storage available to hold a container instantiated from the container image 212 at the instantiation location 204 is no larger than F before sending 718 the container image pull request 502 to the container registry 206. Despite this apparent lack of sufficient space, use of layer mounts 410 allows the container to be launched. That is, the container is instantiated at the local location 204 even though the container image 212 occupies an amount of storage at the container registry 206 (or implicitly, the registry's repository 708) which is greater than F.

In some embodiments, the union file system 404 unifies different instances of a single file system 414, but in other embodiments the union file system 404 unifies different file systems 414. That is, in some embodiments each of a plurality of layers 214 of the container image 212 has a respective file system 414, and the union file system 404 combines at least two layer file systems 414 which are different from one another, e.g., one may be a Linux® (mark of Linus Torvalds) file system 414 and another may be a Microsoft Windows® (mark of Microsoft Corporation) file system 414. Or the file systems 414 may differ in the sense that they are based on different Linux® distributions.

Some embodiments are compatible with the Open Container Initiative. In some, the memory 112 is configured by a changeset 412 which describes a file system 414 of the layer, and the memory 112 is also configured a configuration 416 of the container image 212 which describes an ordering of multiple layers of the container image. Unless otherwise stated, it is understood that the changeset 412, and the configuration 416, are each compatible with the most recent public version of the Open Container Initiative specification of those respective items which was available at the time of the priority date of the current disclosure under applicable patent law.

Other system embodiments are also described herein, either directly or derivable as system versions of described processes or configured media, informed by the extensive discussion herein of computing hardware.

Although specific architectural examples are shown in the Figures, an embodiment may depart from those examples.

For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, communication sequences, environments, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (A.k.a. Methods

Figure 9:
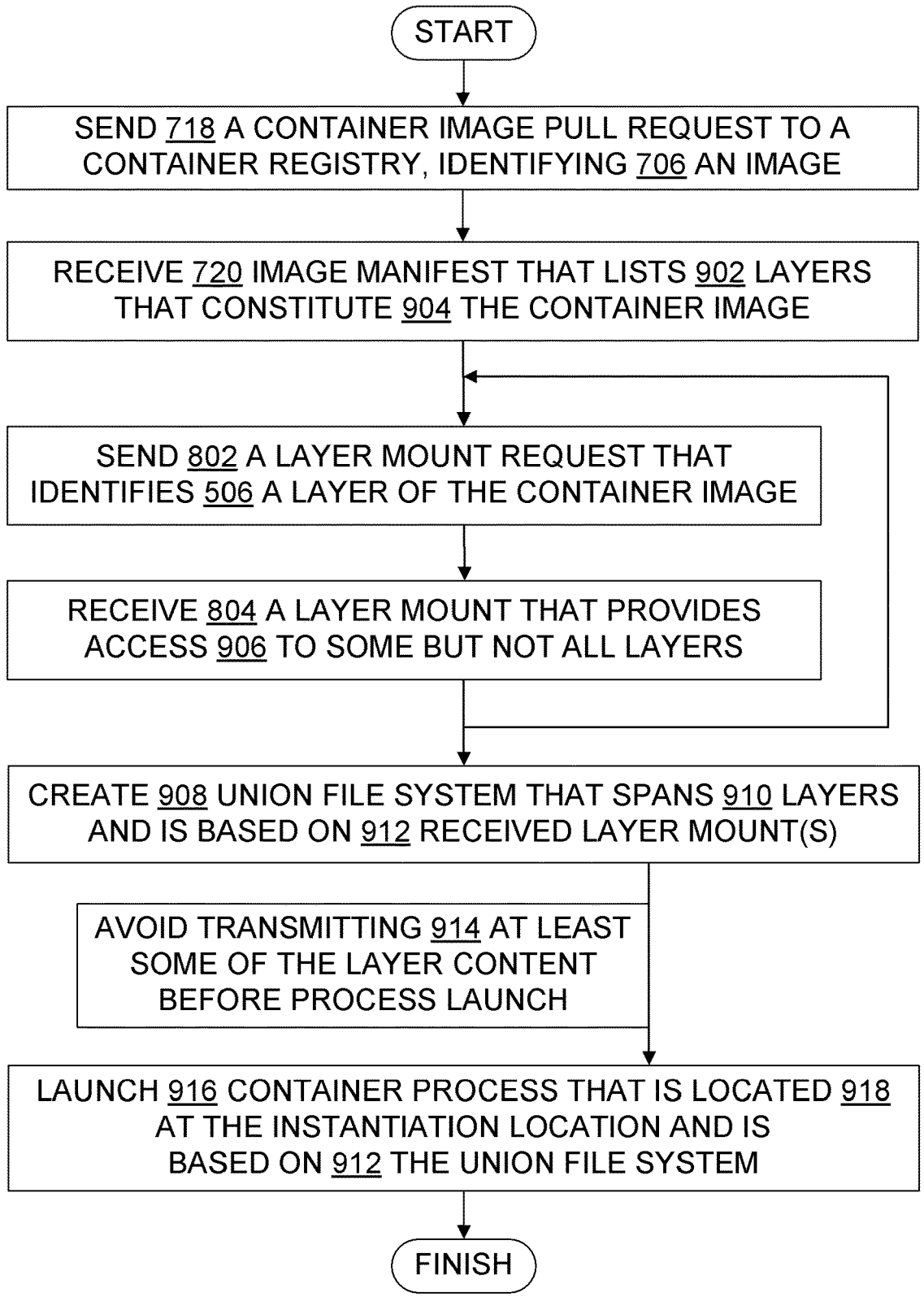
FIG. 9 is a flowchart illustrating steps in some container instantiation methods.

FIG. 9 illustrates a method 900 which is an example of methods that may be performed or assisted by an enhanced system 400. The illustrated method includes (a) sending 718 a container image pull request 502 to a container registry 206, the pull request identifying 706 a container image 212, (b) receiving 720 an image manifest 408 which lists 902 a plurality of layers 214 that collectively constitute 904 the container image, (c) sending 802 a layer mount request 504 to the container registry, the layer mount request identifying 506 a layer of the container image, (d) receiving 804 a layer mount 410 which provides access 906 to some but not all content of the static layers that collectively constitute the container image, (e) creating 908 a union file system 404 which spans 910 the layers that collectively constitute the container image, and (f) launching 916 a container process 402 that is located 918 at the instantiation location and is based on 912 the union file system, while avoiding transmitting 914 at least some of the layer content before launching the process 402.

Figure 10:
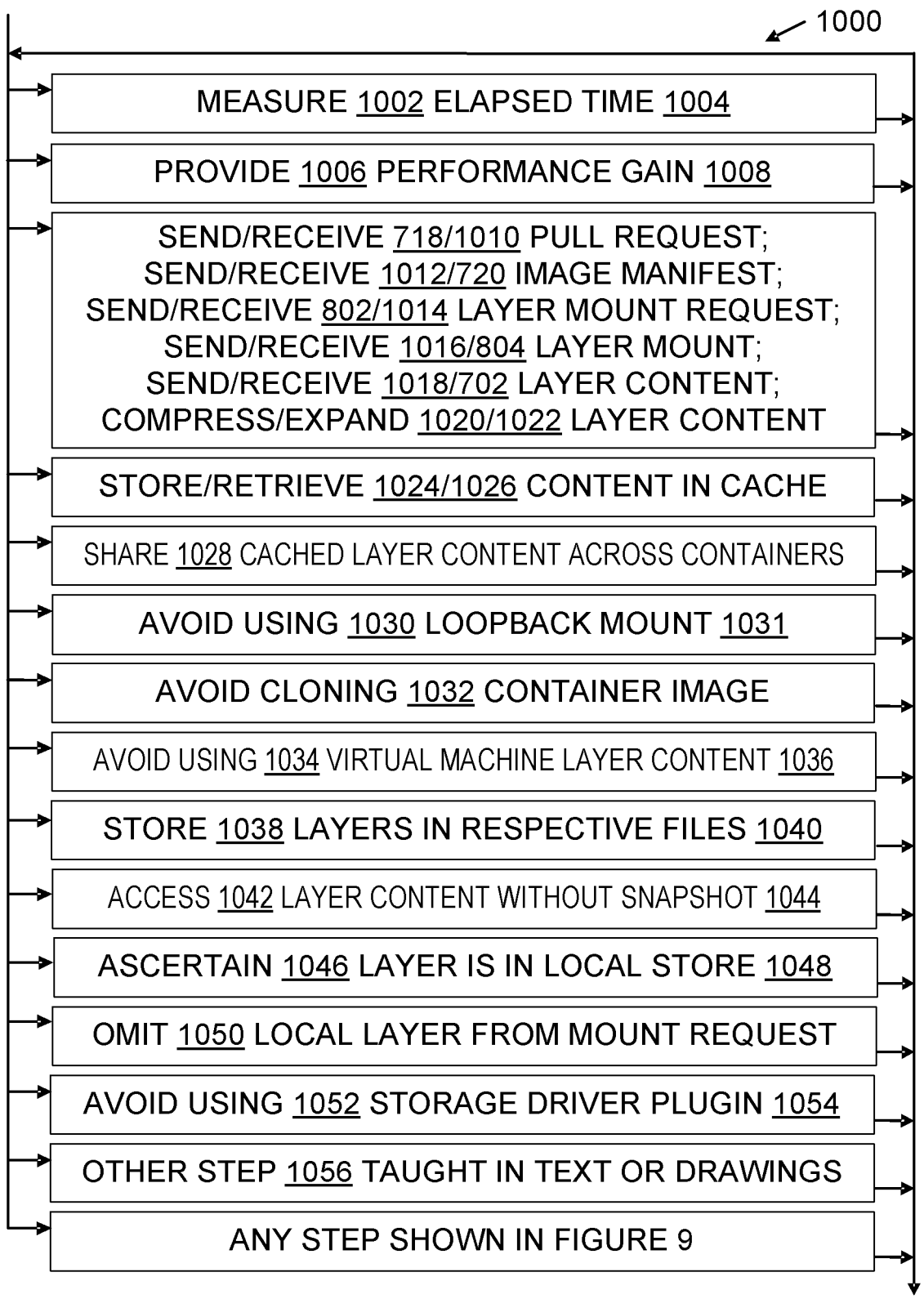
FIG. 10 is a flowchart further illustrating steps in some container instantiation methods.

FIG. 10 further illustrates methods (also referred to as processes) which are suitable for use during container instantiation 920, including refinements, supplements, or contextual actions for steps shown in FIG. 9. Technical processes shown in the Figures or otherwise disclosed will be performed automatically, e.g., by container system software or cloud 302 infrastructure software, unless otherwise indicated. Processes may also be performed in part automatically and in part manually to the extent action by a human administrator or other human person is implicated, e.g., in some embodiments a person may specify which union file system software is desired. No process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Steps may be performed serially, in a partially overlapping manner, or fully in parallel. In particular, the order in which flowchart 900 action items or flowchart 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method for instantiating a container at an instantiation location in a computing system, the method including: sending 718 a container image pull request 502 to a container registry 206, the pull request identifying 706 a container image 212; receiving 720 an image manifest 408 which lists a plurality of layers 214 that collectively constitute 904 the container image, each layer having a respective layer identification 506 and a respective layer content 406; sending 802 a layer mount request 504 to the container registry, the layer mount request identifying 506 a layer of the container image; receiving 804 a layer mount 410 which provides access 906 to a registry-resident form of the content of the layer identified in the layer mount request without also providing access to all content of all of the layers that collectively constitute the container image; creating 908 a union file system 404 which spans 910 the layers that collectively constitute the container image and is based on 912 at least one received layer mount; launching 916 a container process 402 at the instantiation location based on the union file system; and avoiding 914 transmitting at least a portion of the layer content of the identified layer from the container registry through a network 108 to the instantiation location prior to launching the container process.

Some embodiments provide 1006 a significant performance gain 1008. In some, a first time 1004 denoted here as new-time measures 1002 wall clock time elapsed while sending 718 the container image pull request, receiving 720 the image manifest, sending 802 one or more layer mount requests which collectively identify all layers of the container image that are not stored local to the instantiation location, receiving 804 one or more layer mounts in response to the one or more layer mount requests, and completing creation 908 of the union file system which is based on at least one received layer mount. A second time 1004 denoted here as old-time measures 1002 wall clock time elapsed while sending 718 the container image pull request, receiving 720 the image manifest, downloading 702 to the instantiation location from the container registry the layer content of all layers of the container image that are not already stored local to the instantiation location, decompressing 1022 any downloaded layer content which was downloaded in a compressed form, and creating 908 a localized union file system which spans the layers that collectively constitute the container image. In some of these embodiments, old-time is at least fifteen times new-time. In some, old-time is at least thirty times new-time. In some, old-time is between fifteen and thirty times new-time.

Some embodiments efficiently share layer caching memory across different containers. In some, the method includes storing 1024 the layer content 406 in a cache 716, and sharing 1028 the cached layer content between two different container processes 402. That is, a single cached copy of the static layer content is accessed by each of two or more different container processes 402.

In some embodiments, a first performance of the container instantiation 920 method includes receiving 804 the layer mount which provides access 906 to the registry-resident form of the content of the layer identified in a first layer mount request without also providing access to all content of all of the layers that collectively constitute a first container image, creating 908 a first union file system which spans 910 the layers that collectively constitute 904 the first container image, and launching 916 a container-A process 402 at a first instantiation location based on the first union file system. A second performance of the container instantiation 920 method includes receiving 804 the same layer mount which provides access 906 to the same registry-resident form of the same content of the same layer identified in a second layer mount request without also providing access to all content of all of the layers that collectively constitute 904 a second container image, creating 908 a second union file system which spans the layers that collectively constitute the second container image, and launching 916 a container-B process 402 at a second instantiation location based on the second union file system. The first union file system is also based on a layer mount of a layer 214 denoted here as layer-A that is not part of container-B, and the second union file system is also based on a layer mount of a layer denoted here as layer-B that is not part of container-A. Thus, this embodiment involves sharing 1028 a single instance of layer content between two containers while also furnishing each of the two containers with layer content that is not part of the other container.

In some embodiments, use of the communications and operations and data structures and software as taught herein results in one or more of the following: avoiding 1030 using a loopback mount 1031 to expand a snapshot 1044, avoiding 1032 cloning the container image to get a layer content copy to download, avoiding 1034 storing virtual machine settings 1036 in static layer content 406, storing 1038 each layer of the container in a different file 1040 than the other layers of the container, or avoiding 1052 use of a storage driver plugin 1054 to populate containers with layer content. In some embodiments, the method avoids 1052 using any storage driver plugin to send 802 the layer mount request and also avoids 1052 using any storage driver plugin to receive 804 the layer mount.

Some embodiments check to determine what layers 214 they already have in a local cache 716 or other local store 1046, to avoid unnecessary content 406 downloads. Some include ascertaining 1046 that a layer L which is listed in the image manifest is stored local to the instantiation location, and omitting 1050 identification of layer L from any layer mount request which is sent to the container registry as a part of instantiating the container.

In some embodiments, mounts can be provided to expanded or compressed file system formats. In some, the method includes receiving 804 a first layer mount 410 which provides access to an unpacked registry-resident form 806 of first content of a first layer which belongs to the container image, and receiving 804 a second layer mount 410 which provides access to a packed registry-resident form 732 of second content of a second layer which belongs to the container image.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as layer mounts 410, changesets 412, image configurations 416, container instantiation communications 216, union file systems 404, and software implementing the data flow illustrated in FIG. 8 or the methods illustrated in FIGS. 9 and 10, in the form of data 118 and instructions 116, read from a removable storage medium 114 and/or another source such as a network connection, to form a configured storage medium. The configured storage medium 112 is capable of causing a computer system 400 or 206 or both to perform technical process steps for container instantiation 920, as disclosed herein. The Figures thus help illustrate configured storage media embodiments and process (a.k.a. method) embodiments, as well as system and process embodiments. In particular, any of the process steps illustrated in FIG. 9 or 10, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 perform a registry method supporting instantiation 920 of a container at an instantiation location 204 in a computing system. This method includes a container registry 206 receiving 1010 a container image pull request 502, the pull request identifying a container image 212; the container registry sending 1012 an image manifest 408 which lists a plurality of layers that collectively constitute 904 the container image, each layer having a respective layer identification 506 and a respective layer content 406; the container registry receiving 1014 a layer mount request 504, the layer mount request identifying a layer of the container image; the container registry sending 1016 a layer mount 410 which provides access to a registry-resident form of the content of the layer identified in the layer mount request without also providing access to all content of all of the layers that collectively constitute the container image; and the container registry avoiding 914 sending to an instantiation location which is remote from the container registry at least a portion of the layer content of the identified layer prior to a launch at the instantiation location of a container process that is based on the container image.

In some embodiments, multiple layer mounts are sent 1016 from the container registry, and each said layer mount corresponds 602 in a one-to-one manner to one layer of the container image.

In some embodiments, the method further includes storing 1024 the layer content in a cache, and sharing 1028 the cached layer content between two different container processes.

In some embodiments, the method is further characterized in at least one of the following ways: the method avoids cloning 1032 the container image in response to an layer mount request; each layer content is free of virtual machine settings 1036; each layer content is accessible 1042 without accessing any snapshot 1044; or each layer of the container is stored 1038 in a different file 1040 from the other layers of the container.

In some embodiments, the method includes the container registry sending 1016 a first layer mount which provides access to an unpacked registry-resident form 806 of first content of a first layer which belongs to the container image, and the container registry sending 1016 a second layer mount which provides access to a packed registry-resident form 732 of second content of a second layer which belongs to the container image.

Additional Examples and Observations

One of skill will recognize that not every part of this disclosure, or any particular details therein, are necessarily required to satisfy legal criteria such as enablement, written description, or best mode. Also, embodiments are not limited to the particular networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

An Azure® Example. Some embodiments reduce the startup time for containers which have not been cached locally, e.g., cold-start containers. In one internal implementation, during a container pull a local system 400 communicates to an Azure® Container Registry 206 (mark of Microsoft Corporation) that the local system wants to get unpacked content 806 if such is available. The registry 206 responds 1016 with a list of mount points 410 related to each layer in the image if it is unpacked. The local system stores these mount points in a metadata store 418 and associates it with the manifest 408 returned from the registry. The local system retrieves these mount points and combines them 908 using a union file system such as aufs or overlayfs to allow the image to run.

This internal implementation was built to be consistent with the Open Containers Initiative (OCI), which supports all familiar container image formats. This implementation was not limited to only being used with a Docker® container system (mark of Docker, Inc.), and does not require a corresponding storage drive plugin. Some approaches taught herein allow further development by developers and use with various runtimes, as they are not limited to the context of Docker® container software. Some approaches taught herein may be optimized with specific syscalls for relevant file system subsystems. Some approaches taught herein support hybrid file system 414 overlays 404, e.g., one layer 214 in the container 210 can be represented as an ext4 file system, another layer can be represented as a Common Internet File System (CIFS), another as a Filesystem in User Space (FUSE), and another as a loopback mount 1031. Note, however, that use of loopback mounts to expand container snapshots 1044 and image clones can be avoided as sources of layer content, since layers 214 can be individually mounted using layer mounts 410 and layers 214 can be stored 1038 in individual respective files 1040. In some embodiments, each layer 214 in a container can be set as an individual mount, or each image can be represented as an individual mount.

Some Remarks About Snapshots. In many if not all traditional container contexts, a snapshot 1044 represents a checkpoint from a virtual machine 304. Therefore, a snapshot including a container holds additional information 1036 beyond the scope of containers per se, such as virtual machine settings and a virtual disk. A memory snapshot may also hold active running state from the virtual machine, or other files created from other programs. Thus, snapshots are roughly comparable to some disks (specifically the VHD/VHDX formats) of a Hyper-V® hypervisor 120 (mark of Microsoft Corporation) or another hypervisor 120. In one traditional approach, a single snapshot can be used to compose an entire container. This is reminiscent of a flattened file system in which the entire container is represented by a single file. Layers 214 are flattened, so mounting any one layer will provide a complete view of a file system that could be used by a container. However, in some cases a framework (such as at least one version of Docker® software) has no notion of flattened layers. When such a framework pulls an image, it fetches all the layers, passing each to the driver with an operation to apply differences. As a result, computationally expensive clones are made.

In some embodiments according to teachings herein, by contrast, a mount 410 represents one or more layers 214. An embodiment may have the ability to flatten certain layers dynamically, but still allow a 1:1 relationship. In a traditional model, a single snapshot represents all layers 214 of the container in a flattened format.

Also, in some embodiments according to teachings herein, mounts 410 can provide access to expanded or compressed file system formats. In particular, some can support VHD/VHDX/VMStore or an expanded file system. One traditional approach only allows the VMStore representation from snapshots, which is expanded using loopback mounts. As a corollary, the innovative embodiment does not require any layer content 1036 beyond the scope of a container (more specifically, beyond the scope of one or more layers). The layer content 406 can be kept free of virtual machine settings, virtual machine disk, and memory information.

Also, when a traditional approach represents the entire file system of a container, that approach does not support efficiently sharing 1028 layer caching memory across different containers. For example, consider a container A and a container B. If they share a layer Z, then this traditional approach uses two different snapshots: a Snapshot F and a snapshot G. Snapshots F and G will not be able to share memory since they are different files, and thus will perform worse than at least some of the approaches taught herein. Under teachings herein, containers A and B can share 1028 a layer Z directly, where layer Z is represented by either a single file (e.g., in a VHD/VHDX/other disk form) or many files (in expanded form) thus sharing the local in-memory cache from the kernel.

Also, during the mounting process at least some approaches taught herein do not waste any memory or compute on unnecessary copies of layer content 406. An enhanced system 400 may simply perform one mount for each layer; since a mount represents one or more layers, there is no waste like there is in traditional approaches that make or use snapshot clones for many-layer images. Some of these traditional approaches effectively discard all of the information from anything but the top layer, since the top layer has all of the information in a flattened format. As a consequence, for any image that has a sufficient number of layers, an embodiment as taught herein will perform significantly better than the traditional approaches. For example, internal testing revealed similar performance in the case of a 35-layer image as for images with many fewer layers. Even with a 35-layer image, internal testing revealed a thirty to thirty-five speedup factor from a traditional download of an image 212.

Some Additional Test Results. One particular set of internal tests used a 35-layer Jupyter Notebook container image 212 which consumed about 5.75 GB on disk and about 2 GB in compressed form. As a local system, a virtual machine 304 having 8 virtual CPUs, 30 GB of virtual disk, and 32 GB of memory, was employed in these tests, with each of two disk options: a standard SSD and a premium SSD. Without the fast container instantiation enhancements taught herein, an instantiation of this Jupyter Notebook container took 10 minutes 4 seconds with the standard SSD and 6 minutes 44 seconds with the premium SSD. In sharp contrast, with fast container instantiation enhancements taught herein, an instantiation 920 of this Jupyter Notebook container took zero minutes 15 seconds with the standard SSD and zero minutes 13 seconds with the premium SSD. Thus, in this test the performance gain for the standard SSD system was a speedup factor of over 40 and for the premium SSD was a speedup factor of over 31.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to enhance a computing system 102 to make container instantiation 920 faster, reduce layer 214 content 406 storage demands, and make more container image 212 formats available. A system 102, 400 at a container instantiation location 204 sends 718 a container image pull request 502 to a container registry 206, receives 720 an image manifest 408, sends 802 a layer mount request 504 to the registry instead of a layer content download request 730 (which is sent later—after instantiation 920—when and if the content is actually needed), receives 804 a layer mount 410, optionally repeats steps 802 and 804 to get layer mounts 410 for additional layers, creates 908 a union file system 404 spanning 910 the layers, and launches 916 a container process 402 based on 912 the union file system without first downloading 702 all the static layer content. Inefficiencies and technical limitations of some other approaches are avoided, such as avoiding 1030 loopback mounts 1031 for snapshot 1044 expansion, avoiding creation or transmission of extra snapshots 1044 or extra container image clones 1032, avoiding cluttering 1034 layer content 406 with virtual machine settings 1036, avoiding container system vendor lock-in (e.g., Docker® system lock-in), avoiding lack of container instantiation 920 at a local system due to insufficient local storage, and allowing syscall optimizations due to avoiding 1052 storage driver plugin 1054 usage.

Embodiments are understood to also include or benefit from tested and appropriate security controls and privacy controls such as the General Data Protection Regulation (GDPR), e.g., it is understood that appropriate security measures should be taken to help prevent misuse of container instantiation for the purpose of injecting or propagating malware, and to help avoid tampering with any personal or private information the running containers may process. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 and 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A container instantiation system, comprising:
    a memory at an instantiation location;
    a processor at the instantiation location in operable communication with the memory, the processor configured to perform steps which include (a) sending a container image pull request to a container registry, the pull request identifying a container image, (b) receiving an image manifest which lists a plurality of layers that collectively constitute the container image, each layer having a respective layer identification and a respective layer content, (c) sending a layer mount request to the container registry, the layer mount request identifying a layer of the container image, (d) receiving a layer mount which provides access to a registry-resident form of the content of the layer identified in the layer mount request without also providing access to all content of all of the layers that collectively constitute the container image, (e) creating a union file system which spans the layers that collectively constitute the container image, and (f) launching a container process at the instantiation location based on the union file system, without first obtaining at the instantiation location all content of all of the layers that collectively constitute the container image;
    whereby the memory is configured by at least the image manifest and the union file system.

2. The system of claim 1, wherein multiple layer mounts are received at the instantiation location, and each said received layer mount corresponds in a one-to-one manner to one static layer of the container image.

3. The system of claim 1, wherein the received layer mount corresponds in a one-to-many manner to multiple static layers of the container image, but the received layer mount does not correspond to all of the layers that collectively constitute the container image.

4. The system of claim 1, wherein the launched union file system includes a layer mount denoted here as local-mount which provides access to an unpacked locally-resident layer content that resides in a local storage device which is local to the instantiation location, and wherein the launched union file system also includes a layer mount denoted here as registry-mount which provides access to an unpacked registry-resident layer content that resides in a registry storage device which is not local to the instantiation location.

5. The system of claim 1, wherein an amount of storage available to hold a container instantiated from the container image at the instantiation location is no larger than F before sending the container image pull request to the container registry, and wherein the container image occupies an amount of storage at the container registry which is greater than F.

6. The system of claim 1, wherein each of a plurality of layers of the container image has a respective file system, and wherein the union file system combines at least two layer file systems which are different from one another.

7. The system of claim 1, wherein the memory is also configured by: a changeset which describes a file system of the layer, and a configuration of the container image which describes an ordering of multiple layers of the container image.

8. A method of instantiating a container at an instantiation location in a computing system, the method comprising:
    sending a container image pull request to a container registry, the pull request identifying a container image;
    receiving an image manifest which lists a plurality of layers that collectively constitute the container image, each layer having a respective layer identification and a respective layer content;
    sending a layer mount request to the container registry, the layer mount request identifying a layer of the container image;
    receiving a layer mount which provides access to a registry-resident form of the content of the layer identified in the layer mount request without also providing access to all content of all of the layers that collectively constitute the container image;
    creating a union file system which spans the layers that collectively constitute the container image and is based on at least one received layer mount;
    launching a container process at the instantiation location based on the union file system; and
    avoiding transmitting at least a portion of the layer content of the identified layer from the container registry through a network to the instantiation location prior to launching the container process.

9. The method of claim 8,
    wherein a time denoted here as new-time measures wall clock time elapsed while sending the container image pull request, receiving the image manifest, sending one or more layer mount requests which collectively identify all layers of the container image that are not stored local to the instantiation location, receiving one or more layer mounts in response to the one or more layer mount requests, and completing creation of the union file system which is based on at least one received layer mount;

wherein a time denoted here as old-time measures wall clock time elapsed while sending the container image pull request, receiving the image manifest, downloading to the instantiation location from the container registry the layer content of all layers of the container image that are not already stored local to the instantiation location, decompressing any downloaded layer content which was downloaded in a compressed form, and creating a localized union file system which spans the layers that collectively constitute the container image;

and wherein old-time is at least fifteen times new-time.

10. The method of claim 8, wherein the method further comprises:

storing the layer content in a cache; and sharing the cached layer content between two different container processes.

11. The method of claim 8, wherein:

a first performance of the container instantiation method comprises receiving the layer mount which provides access to the registry-resident form of the content of the layer identified in a first layer mount request without also providing access to all content of all of the layers that collectively constitute a first container image, creating a first union file system which spans the layers that collectively constitute the first container image, and launching a container-A process at a first instantiation location based on the first union file system;

a second performance of the container instantiation method comprises receiving the same layer mount which provides access to the same registry-resident form of the same content of the same layer identified in a second layer mount request without also providing access to all content of all of the layers that collectively constitute a second container image, creating a second union file system which spans the layers that collectively constitute the second container image, and launching a container-B process at a second instantiation location based on the second union file system;

wherein the first union file system is further characterized in that it is also based on a layer mount of a layer denoted here as layer-A that is not part of container-B, and wherein the second union file system is further characterized in that it is also based on a layer mount of a layer denoted here as layer-B that is not part of container-A;

thereby sharing a single instance of layer content between two containers while also furnishing each of the two containers with layer content that is not part of the other container.

12. The method of claim 8, wherein the method is further characterized in at least one of the following ways:

the method avoids using a loopback mount to expand a snapshot;

the method avoids cloning the container image;

each layer content is free of virtual machine settings; or each layer of the container is stored in a different file from the other layers of the container.

13. The method of claim 8, further comprising:

ascertaining that a layer L which is listed in the image manifest is stored local to the instantiation location; and omitting identification of layer L from any layer mount request which is sent to the container registry as a part of instantiating the container.

14. The method of claim 8, wherein the method avoids using any storage driver plugin to send the layer mount request and also avoids using any storage driver plugin to receive the layer mount.

15. The method of claim 8, wherein the method comprises:

receiving a first layer mount which provides access to an unpacked registry-resident form of first content of a first layer which belongs to the container image; and receiving a second layer mount which provides access to a packed registry-resident form of second content of a second layer which belongs to the container image.

16. A computer-readable storage medium configured with data and instructions which upon execution by a processor perform a registry method supporting instantiation of a container at an instantiation location in a computing system, the method comprising:

a container registry receiving a container image pull request, the pull request identifying a container image;

the container registry sending an image manifest which lists a plurality of layers that collectively constitute the container image, each layer having a respective layer identification and a respective layer content;

the container registry receiving a layer mount request, the layer mount request identifying a layer of the container image; and the container registry sending a layer mount which provides access to a registry-resident form of the content of the layer identified in the layer mount request without also providing access to all content of all of the layers that collectively constitute the container image; and the container registry avoiding sending to an instantiation location which is remote from the container registry at least a portion of the layer content of the identified layer prior to a launch at the instantiation location of a container process that is based on the container image.

17. The storage medium of claim 16, wherein multiple layer mounts are sent from the container registry, and each said layer mount corresponds in a one-to-one manner to one layer of the container image.

18. The storage medium of claim 16, wherein the method further comprises:

storing the layer content in a cache; and sharing the cached layer content between two different container processes.

19. The storage medium of claim 16, wherein the method is further characterized in at least one of the following ways:

the method avoids cloning the container image in response to an layer mount request;

each layer content is free of virtual machine settings;

each layer content is accessible without accessing any snapshot; or each layer of the container is stored in a different file from the other layers of the container.

20. The storage medium of claim 16, wherein the method comprises:

the container registry sending a first layer mount which provides access to an unpacked registry-resident form of first content of a first layer which belongs to the container image; and the container registry sending a second layer mount which provides access to a packed registry-resident form of second content of a second layer which belongs to the container image.

* * * * *